United States Patent [19]
Hamilton

[11] Patent Number: 4,882,942
[45] Date of Patent: Nov. 28, 1989

[54] STEERING WHEEL ATTACHMENT FOR RADIO CONTROL DEVICES

[76] Inventor: Hudson Hamilton, 2924 Eveningside, Topeka, Kans. 66614

[21] Appl. No.: 206,047

[22] Filed: Jun. 13, 1988

[51] Int. Cl.[4] ........................ G05G 1/00; F16H 21/44; A63H 17/39

[52] U.S. Cl. ..................................... 74/104; 74/10 R; 74/10 A; 74/494; 74/553; 200/330; 273/148 B; 446/456

[58] Field of Search ...................... 74/10 R, 10 A, 104, 74/494, 553; 200/330, 336; 273/148 B; 446/454, 456

[56] References Cited

U.S. PATENT DOCUMENTS

| | | | |
|---|---|---|---|
| 2,639,356 | 5/1953 | Savage | 200/330 |
| 3,075,396 | 1/1963 | Smith | 74/104 |
| 4,166,338 | 9/1979 | Asano | 446/456 |
| 4,563,162 | 1/1986 | Ishimoto | 446/454 XR |

FOREIGN PATENT DOCUMENTS

| | | | |
|---|---|---|---|
| 1166123 | 6/1958 | France | 446/454 |
| 2187650 | 9/1987 | United Kingdom | 446/456 |

*Primary Examiner*—Allan D. Herrmann
*Attorney, Agent, or Firm*—D. A. N. Chase; Joan O. Herman

[57] ABSTRACT

An attachment for use in conjunction with radio control transmitters, especially for use with model cars, which has a steering wheel and a fork-shaped lever extending therefrom. The lever is adapted to fit over the directional control stick of the transmitter, whereby the rotary motion created by turning the steering wheel translates into the rectilinear motion which actuates the control stick. Realism and enhanced operator control are achieved.

4 Claims, 1 Drawing Sheet

STEERING WHEEL ATTACHMENT FOR RADIO CONTROL DEVICES

BACKGROUND OF THE INVENTION

This invention relates to attachments to transmitters for remote control devices and, in particular, to a steering wheel control which is adapted for use in conjunction with conventional radio control transmitters. This steering wheel control is specifically designed to convert the rectilinear motion of a conventional control stick to the rotary motion of the steering wheel control.

Radio control devices for remotely controlling model vehicles and the like are becoming very popular for recreational use. Generally, most radio control devices comprise a radio transmitter with a control stick assembly, or "joy stick" control, and a radio receiver in the item to be controlled. Transmitters utilizing steering wheel controls are available, but are generally much more expensive. The operator of the device will move the control stick and, in response to radio signals produced thereby, the model vehicle or other item will move in a specific direction or at a specific rate of speed. Most controls employ either toggle switches or potentiometers at the transmitter. The rectilinear motion required by either of these switches is adequate to provide easy maneuverability in order for the operator to produce simple up and down or forward and backward motion. However, when these radio control devices are used for model cars, it is awkward for a typical operator to produce left or right turns by making corresponding linear left or right movements of the control stick.

Accordingly, the present invention utilizes a steering wheel attachment which can be adapted for use with most conventional radio control transmitters. It is adjustable to fit a wide variety of sizes of such transmitters. The present invention provides an inexpensive way to convert a transmitter employing linear motion for directional movement of the model, to a transmitter employing rotary motion. This steering wheel control gives the operator a greater sense of realism, as well as more control. Thus, the transmitter to which this attachment is fitted becomes less awkward to use and thus more desirable to operate.

OBJECTS OF THE INVENTION

It is, therefore, an important object of the present invention to provide a steering wheel attachment for radio control devices which can be easily and inexpensively attached to conventional radio control transmitters.

It is another important object of the present invention to provide a steering wheel attachment, as aforesaid, which is adjustable for use with varying sizes of transmitters.

It is a further object of the present invention to provide a steering wheel attachment, as aforesaid, which converts the rectilinear motion of a conventional control stick to the rotary motion of a steering wheel.

It is still another important object of the present invention to provide a steering wheel attachment, as aforesaid, which allows the operator to achieve more realism and control when maneuvering the transmitter control stick.

DETAILED DESCRIPTION OF THE PREFERRED EMBODIMENT

Figure 1:
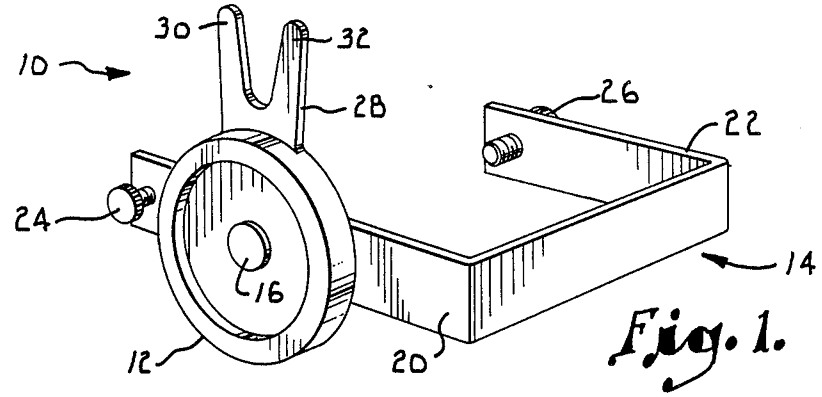
FIG. 1 is a perspective view of the steering wheel attachment of the present invention.

A steering wheel attachment 10 has a generally circular steering wheel 12 rotatably mounted on a U-shaped member 14. The rotatable mounting may be accomplished by any conventional means, but is preferably a nut 16, bolt and washer 18 assembly (the bolt is not shown) attaching the steering wheel 12 to a hole (not shown) in one branch 20 of the member 14, the hole being slightly larger than the diameter of the bolt to allow the steering wheel 12 to be freely movable. Each branch 20 and 22 of the member 14 has a thumb screw 24 and 26, respectively, disposed adjacent the outer ends thereof.

A fork-shaped lever 28 extends from the steering wheel 12, and has two arms 30 and 32 thereon. The arms 30 and 32 are sufficiently spaced apart to receive the control stick 34 of a conventional radio control transmitter 36, and diverge as they project from the steering wheel 12. In another embodiment (not shown), the arms 30 and 32 are essentially parallel, but are constructed of a material which allows them to temporarily deform when pressure is applied thereto by the control stick 34 as the steering wheel 12 is rotated, as described in greater detail below. The steering wheel attachment 10 can be constructed of any durable material, such as a lightweight metal or a durable plastic.

Figure 2:
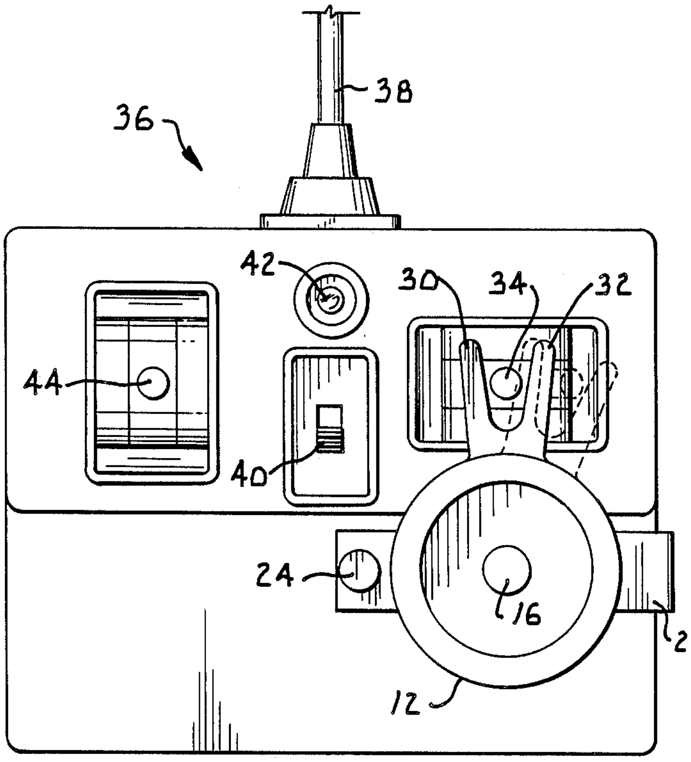
FIG. 2 is a front elevational view of the steering wheel attachment operatively positioned on a conventional radio control transmitter, with the broken lines depicting the movement of the steering wheel when actuating the directional control stick.
Figure 3:
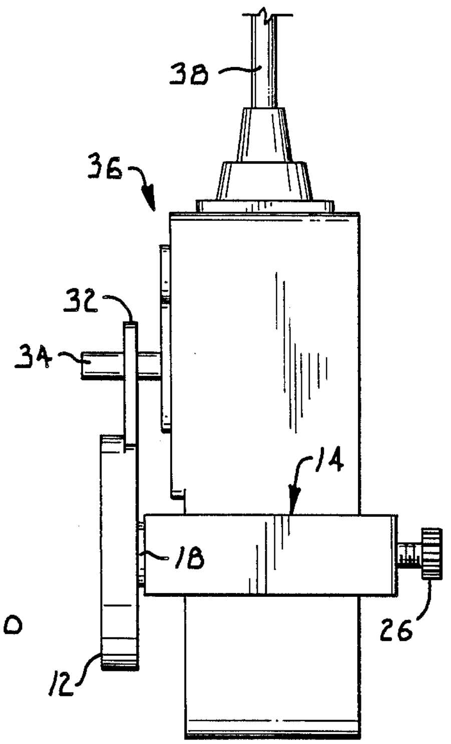
FIG. 3 is an elevational view of the right side of the steering wheel as in FIG. 2.
Figure 4:
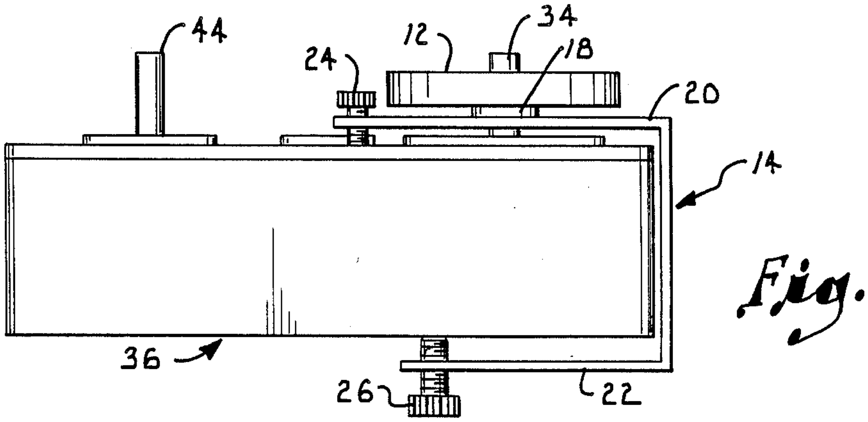
FIG. 4 is a bottom view of the steering wheel attachment as in FIGS. 2 and 3.

In operation, the steering wheel attachment 10 is positioned on a conventional radio control transmitter 36 as is shown in FIGS. 2–4. In general, the transmitter 36 has an antenna 38 which transmits radio signals to a receiver located in model cars or the like. An on/off switch 40 is provided, with an indicator light 42 being lit when the transmitter 36 is transmitting signals. Control stick 44 activates forward and reverse movement in the model, while directional control stick 34 activates left and right movements of the car. The steering wheel attachment 10 is primarily useful with the directional control stick 34. The arms 30 and 32 are positioned on either side of the directional control stick 34, and the thumb screws 24 and 26 are then adjusted so the steering wheel attachment 10 is securely mounted on the transmitter 36.

As can be seen in FIG. 2, the steering wheel 12 is rotated by the operator and the fork-shaped lever 20, in turn, rotates therewith. When the steering wheel 12 is rotated to the right, as shown, arm 30 engages control stick 34. As the steering wheel 12 is rotated further, arm 30 actuates control stick 34 by forcing it to the right in response to the rotation. Thus the rotary motion of the steering wheel 12 is translated into rectilinear motion, whereby the directional control stick 34 is actuated. Correspondingly, rotating the steering wheel 12 to the left actuates the control stick 34 by forcing it to the left in the manner described above.

These right and left movements of the directional control stick 34 cause radio signals to be transmitted, and these signals are then received by radio control receivers located in model cars and the like. Movement of the directional control stick 34 to the right will correspondingly cause the model car (not shown) to turn to the right, and movement of the control stick 34 to the left will cause corresponding movement of the model car to the left. When the operator desires a left or right turn of the model car, it is instinctively less awkward to rotate a steering wheel than to linearly activate a control stick. The steering wheel attachment 10 provides the operator with a greater sense of realism, and allows him to achieve more control in activating the directional control stick 34.

It is to be understood that while certain forms of this invention have been illustrated and described, it is not limited thereto, except in so far as such limitations are included in the following claims.

Having thus described the invention, what is claimed as new and desired to be secured by Letters Patent is:

1. An actuating mechanism for attachment to radio control transmitters having a housing and a linearly moveable control stick protruding therefrom, comprising:

a steering wheel apparatus actuatable by rotary motion;

a fork-shaped operating member having two arms extending from said steering wheel apparatus for rotation therewith, and adapted to receive said control stick between said arms;

means for detachably mounting said apparatus to the remote control transmitter in an operative position;

whereby when said mechanism is in said operative position on the transmitter, said operating member receives the control stick between said arms and translates the rotary motion of said steering wheel apparatus into rectilinear motion to actuate the control stick; and said arms of said operating member diverging as they project from said steering wheel apparatus.

2. The actuating mechanism as set forth in claim 1, wherein said mounting means comprises an essentially U-shaped element on which said apparatus is rotatably mounted, said element adapted for attachment to the housing of the radio control transmitter by securing means, whereby said element remains stationary during use.

3. The actuating mechanism as set forth in claim 2, wherein said securing means comprises a pair of adjustable screws disposed at opposite ends of said mounting element, whereby said mechanism is adaptable for use with radio control transmitters of various sizes.

4. An actuating mechanism for attachment to radio control transmitters having a housing and a linearly moveable control stick protruding therefrom, comprising:

a steering wheel apparatus actuatable by rotary motion;

a fork-shaped operating member having two arms extending from said steering wheel apparatus for rotation therewith, and adapted to receive said control stick between said arms;

means for detachably mounting said apparatus to the remote control transmitter in an operative position;

whereby when said mechanism is in said operative position on the transmitter, said operating member receives the control stick between said arms and translates the rotary motion of said steering wheel apparatus into rectilinear motion to actuate the control stick; and said arms of said operating member being essentially parallel and being made of sufficiently resilient material to allow said arms to deform, whereby said arms are adapted to temporarily deform and thereby diverge when pressure is adapted thereto by the control stick in response to the rotation of said steering wheel apparatus.

* * * * *